United States Patent
Akondy

(10) Patent No.: US 10,361,838 B2
(45) Date of Patent: Jul. 23, 2019

(54) TWO-WIRE COMMUNICATION INTERFACE SYSTEM

(71) Applicant: TEXAS INSTRUMENTS INCORPORATED, Dallas, TX (US)

(72) Inventor: Subrahmanya Bharathi Akondy, Cypress, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/662,249

(22) Filed: Jul. 27, 2017

(65) Prior Publication Data

US 2019/0036677 A1  Jan. 31, 2019

(51) Int. Cl.
*H04L 7/00* (2006.01)
*H04L 12/407* (2006.01)
*H04L 25/49* (2006.01)

(52) U.S. Cl.
CPC .......... *H04L 7/0091* (2013.01); *H04L 7/0079* (2013.01); *H04L 12/407* (2013.01); *H04L 25/49* (2013.01)

(58) Field of Classification Search
CPC ..... H04L 7/0091; H04L 12/407; H04L 25/49; H04L 7/0079; H04L 12/403; H04L 5/1476; H04L 25/0268
USPC ........................................ 375/356, 354, 359
See application file for complete search history.

(56) References Cited

U.S. PATENT DOCUMENTS

| | | | | |
|---|---|---|---|---|
| 3,967,058 A | * | 6/1976 | Moriya | H04L 5/1476 370/294 |
| 5,600,634 A | * | 2/1997 | Satoh | H04L 12/403 370/294 |
| 6,134,668 A | | 10/2000 | Sheikh et al. | |
| 6,169,801 B1 | * | 1/2001 | Levasseur | H04L 25/0268 370/279 |
| 2016/0252892 A1 | | 9/2016 | Valcore, Jr. et al. | |
| 2016/0314092 A1 | | 10/2016 | Suzuki et al. | |

OTHER PUBLICATIONS

Notification of Transmittal of the International Search Report and the Written Opinion of the International Searching Authority, or the Declaration; 8 pages; dated Nov. 1, 2018.

* cited by examiner

*Primary Examiner* — Phuong Phu

(74) *Attorney, Agent, or Firm* — Ebby Abraham; Charles A. Brill; Frank D. Cimino

(57) ABSTRACT

One example includes a master microcontroller in a communication interface system. The microcontroller includes a transmitter configured to generate a clock signal at a selected frequency and to provide the clock signal to a slave microcontroller on a two-wire communication cable during a clock learning mode. The transmitter can be further configured to provide master data signal requests at the selected frequency on the two-wire communication cable during a data transfer mode. The microcontroller also includes a receiver configured to receive slave data signals at the variable frequency via the two-wire communication cable in response to the master data signal requests during the data transfer mode.

16 Claims, 3 Drawing Sheets

TWO-WIRE COMMUNICATION INTERFACE SYSTEM

TECHNICAL FIELD

This disclosure relates generally to electronic systems, and more specifically to a two-wire communication interface system.

BACKGROUND

Master/slave communication interface systems exist for a variety of applications. As an example, position encoders can implement master/slave communications systems in which a master microcontroller can request position data that is provided from a slave microcontroller. The transfer of data over the master and slave microcontrollers can be clocked to ensure that the data is properly interpreted by the associated microcontroller device. As an example, the master/slave communication interface system can be configured as a synchronous communication interface system in which a selected frequency clock signal is transmitted with the data over separate wires relative to the data. As another example, the master/slave communication interface system can be configured as an asynchronous communication interface system in which the data rate of the signals transferred between the master and slave microcontrollers is fixed.

SUMMARY

One example includes a master microcontroller in a communication interface system. The microcontroller includes a transmitter configured to generate a clock signal at a selected frequency of a variable range of frequencies and to provide the clock signal to a slave microcontroller on a two-wire communication cable during a clock learning mode. The transmitter can be further configured to provide master data signal requests at the variable frequency on the two-wire communication cable during a data transfer mode. The microcontroller also includes a receiver configured to receive slave data signals at the selected frequency via the two-wire communication cable in response to the master data signal requests during the data transfer mode.

Another example includes a method for providing two-wire communication between a master microcontroller and a slave microcontroller in a communication interface system. The method includes generating a clock signal at a selected frequency of a variable range of frequencies and providing the clock signal from the master microcontroller to the slave microcontroller via a two-wire communication signal. The method further includes learning the selected frequency of the clock signal at the slave microcontroller and transmitting data between the master microcontroller and the slave microcontroller at the selected frequency via the two-wire communication signal.

Another example includes a communication interface system. The communication interface system includes a master microcontroller configured to generate master data signal requests at a selected frequency of a variable range of frequencies. The system also includes a slave microcontroller configured to receive the master data signal requests and to generate slave data signals at the variable frequency in response to the master data signal requests. The system further includes a two-wire communication cable interconnecting the master and slave microcontrollers and being configured to propagate the master data signal requests and the slave data signals.

DETAILED DESCRIPTION

This disclosure relates generally to electronic systems, and more specifically to a two-wire communication interface system. The communication interface system includes a master microcontroller and a slave microcontroller configured to implement synchronous communication over a two-wire communication cable. The master microcontroller includes a transmitter configured to generate a clock signal that is provided to the slave microcontroller at a selected frequency of a variable range of frequencies. As described herein, the term "variable range of frequencies" is used to describe that the transmitter of the master microcontroller can generate the clock signal at any of a plurality of frequencies, such as based on an internal tunable oscillator, from an external input, or from any of a variety of other ways to provide the clock signal at any given frequency within a range of frequencies. The transmitter of the master microcontroller can thus provide the clock signal at a selected frequency of a variable range of frequencies, with the selected frequency being variable from one application to another, to the slave microcontroller via the two-wire communication cable. In response, the slave microcontroller can be configured to learn the selected frequency of the clock signal. As described herein, the term "learn" with respect to the selected frequency describes the capability of the slave microcontroller to replicate the selected frequency of the clock signal (e.g., internally) to be able to process signals and transmit signals that have data rates equal to the selected frequency.

Subsequent to the learning of the selected frequency, the master and slave microcontrollers can be configured to communicate with each other via the two-wire communication cable. For example, the master microcontroller can be configured to transmit a predetermined test pattern to the slave microcontroller to determine if the slave microcontroller has successfully learned the selected frequency of the clock signal. In response to learning the selected frequency, the slave microcontroller can transmit a predetermined response code to the master microcontroller in response to the predetermined test pattern. Upon acknowledging that the slave microcontroller has learned the selected frequency, the master microcontroller can switch to a free clocking mode in which the master microcontroller provides the clock signal (e.g., to provide power over the two-wire communication cable). Additionally, the master microcontroller can provide master data signal requests at that selected frequency over the two-wire communication cable, and the slave microcontroller can provide slave data signals at the selected frequency over the two-wire communication cable in response to the master data signal requests.

Figure 1:
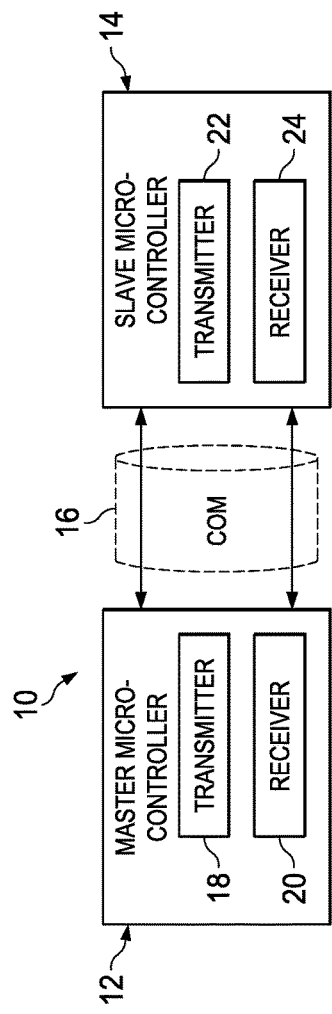
FIG. 1 illustrates an example of a communication interface system.

FIG. 1 illustrates an example of a communication interface system 10. The communication interface system 10 can be implemented in any of a variety of master/slave communication applications, such as for a position encoder system. As an example, the communication interface system 10 can be implemented as or as a repurposed version of an RS-485 communication interface system. As an example, the communication interface system 10 can be configured to implement the synchronous two-wire communications based on a firmware update of an existing RS-485 system, or can be an off-the-shelf system.

The communication interface system 10 includes a master microcontroller 12 and a slave microcontroller 14 that are interconnected by a two-wire communication cable 16. The master microcontroller 12 and the slave microcontroller 14 are configured to implement synchronous communication over the two-wire communication cable 16. In the example of FIG. 1, the master microcontroller 12 includes a transmitter 18 and a receiver 20, and the slave microcontroller 14 includes a transmitter 22 and a receiver 24. The two-wire communication cable 16 can be configured to propagate signals, collectively referred to in the example of FIG. 1 as signals COM, between the master and slave microcontrollers 12 and 14. Because there are different types of signals COM that can be propagated on the two-wire communication cable 16, but only one signal COM at a given time, signals that are provided from the master microcontroller 12 to the slave microcontroller 14 are referred to as signals $COM_{MS}$, and signals that are provided from the slave microcontroller 14 to the master microcontroller 12 are referred to as signals $COM_{SM}$. As an example, the signals COM can be propagated over the two-wire communication cable 16 as differential signals over both wires of the two-wire communication cable 16.

As an example, the master microcontroller 12 can be configured to generate a clock signal that is provided to the slave microcontroller at a selected frequency. The selected frequency can be predefined in any of a variety of ways, such as based on a selected frequency of a range of frequencies that can be provided from an internal tunable oscillator, from an external input, or from any of a variety of other ways to provide the clock signal at any given frequency within a range of frequencies. The transmitter 18 of the master microcontroller 12 can thus provide the signal $COM_{MS}$ as the clock signal at the selected frequency to the slave microcontroller 14 via the two-wire communication cable 16. The slave microcontroller 14 can receive the clock signal via the receiver 24, and in response, the slave microcontroller 14 can be configured to learn the selected frequency of the clock signal. In addition, the clock signal can be configured to provide power from the master microcontroller 12 to the slave microcontroller 14. For example, the clock signal can be provided as having a DC-offset that can be sufficient to provide power (e.g., operational power and/or battery-charging power) to the slave microcontroller 14.

Subsequent to the learning of the selected frequency, the master and slave microcontrollers 12 and 14 can be configured to communicate with each other via the two-wire communication cable 16. For example, the transmitter 18 of the master microcontroller 12 can be configured to transmit a predetermined test pattern that is received by the receiver 24 of the slave microcontroller 14 to determine if the slave microcontroller 14 has successfully learned the selected frequency of the clock signal. In response to learning the selected frequency, the transmitter 22 of the slave microcontroller 14 can transmit a predetermined response code that is received by the receiver 20 of the master microcontroller 12 in response to the predetermined test pattern. Upon acknowledging that the slave microcontroller 14 has learned the selected frequency, the master microcontroller 12 can switch to a free clocking mode in which the transmitter 18 of the master microcontroller 12 provides the clock signal to the receiver 24 of the slave microcontroller 14 (e.g., to provide power over the two-wire communication cable 16). Additionally, the transmitter 18 of the master microcontroller 12 can provide signals $COM_{MS}$ as master data signal requests at the selected frequency over the two-wire communication cable 16. In response to receiving the master data signal requests at the receiver 24, the transmitter 22 of the slave microcontroller 14 can provide slave data signals at the selected frequency over the two-wire communication cable 16 in response to the master data signal requests that are received by the receiver 20 of the master microcontroller 12. Accordingly, the communication interface system 10 can be implemented for synchronous bidirectional communication over the two-wire communication cable 16.

As a result, the communication interface system 10 can provide for a substantial improvement over other types of master/slave communication interface systems. For example, other typical synchronous master/slave communication interface systems can provide synchronous communications, but provide the clock signal separately over a four or six wire interconnection between the master and slave microcontrollers. Therefore, typical synchronous master/slave communication interface systems utilize additional space, cost, and/or hardware to provide synchronous communications. As another example, asynchronous master/slave communication interface systems can provide for communications over a two-wire communication cable, but are limited to a fixed data rate. Accordingly, the communication interface system 10 can provide synchronous communications over the two-wire communication cable 16 to provide for a more compact and cost-effective form, such as to mitigate sensitivity to noise in sampling based on the selected frequency data transfer.

Figure 2:
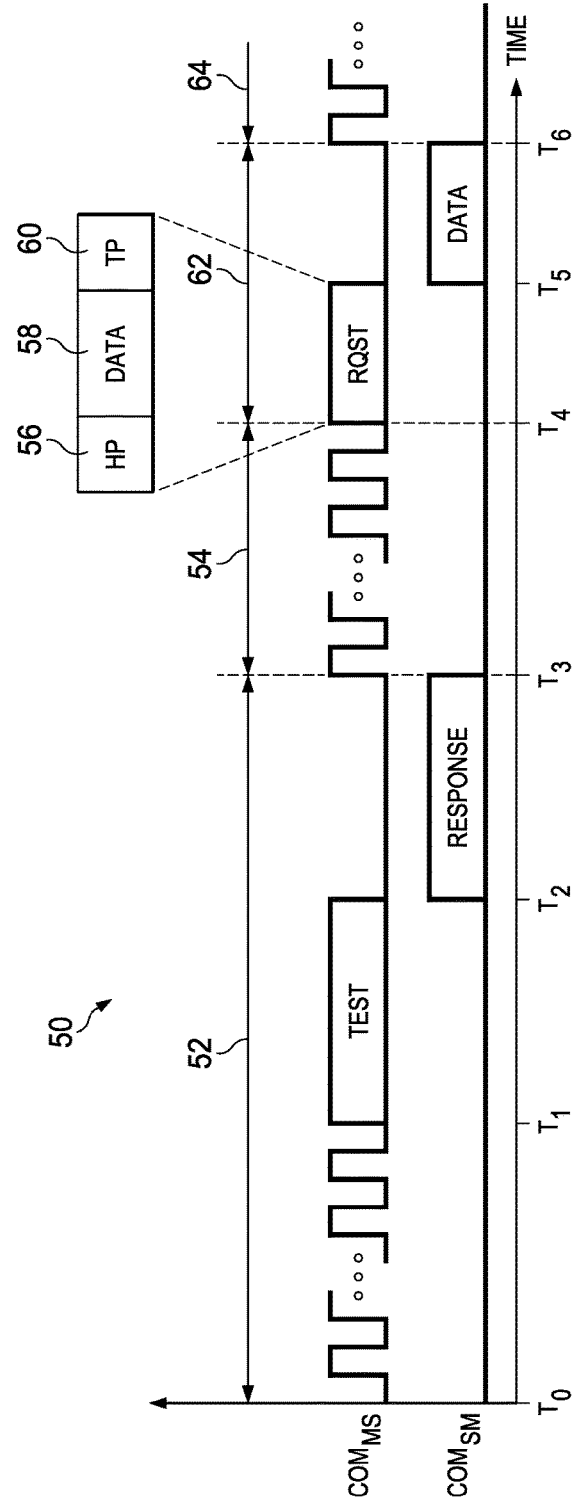
FIG. 2 illustrates an example of a timing diagram.
Figure 3:
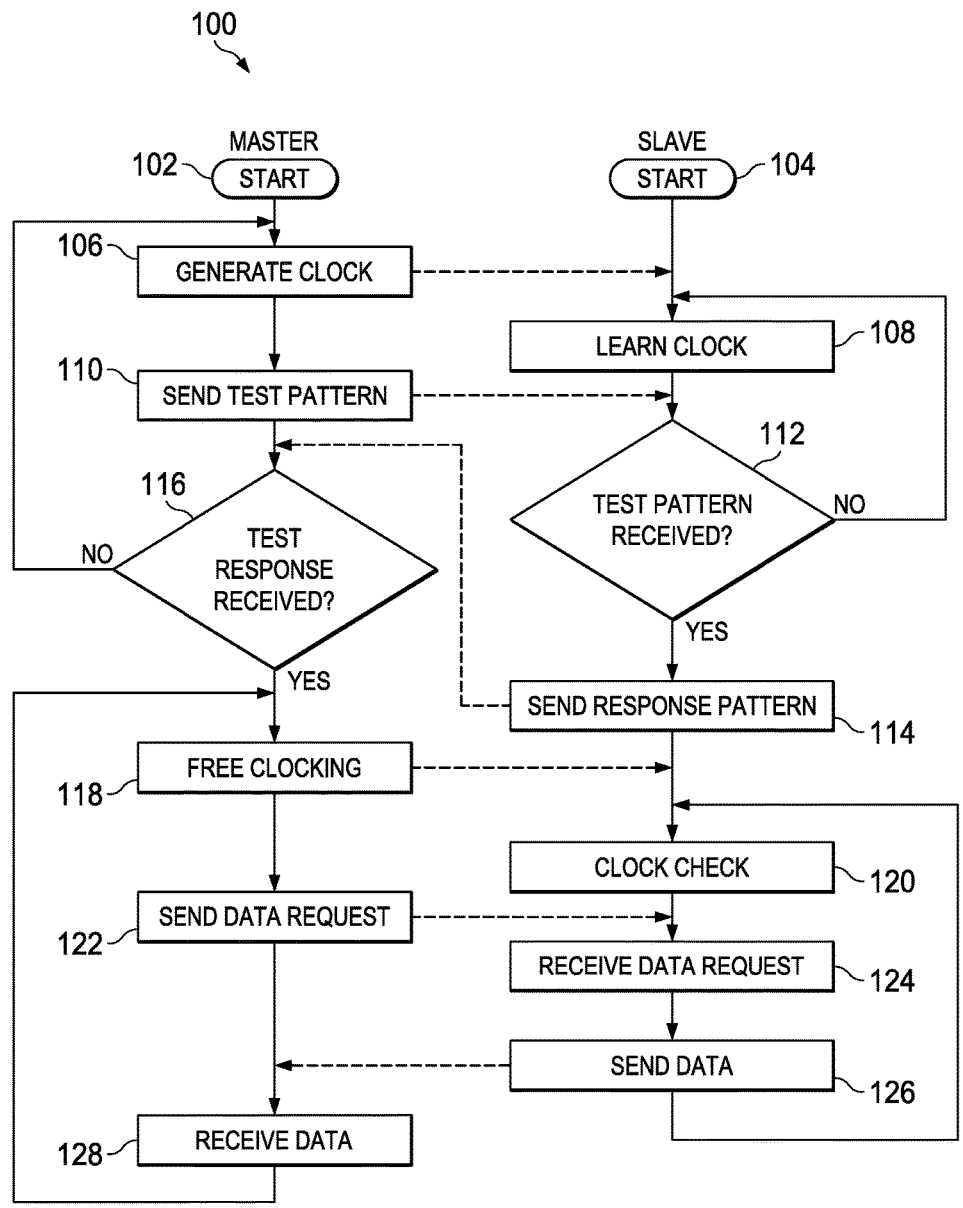
FIG. 3 illustrates an example of a flow diagram.

FIG. 2 illustrates an example of a timing diagram 50 and FIG. 3 illustrates an example of a flow diagram 100. The timing diagram 50 demonstrates the relative timing of the signals $COM_{MS}$ and $COM_{SM}$ with respect to the signal COM on the two-wire communication cable 16. The flow diagram 100 demonstrates the data flow and modes of the respective master and slave microcontrollers 12 and 14. FIGS. 2 and 3 are described herein together to provide for an understanding of the operation of the communication interface system 10. Therefore, reference is to be made to the example of FIG. 1 in the following description of the examples of FIGS. 2 and 3.

The flow diagram 100 includes a column corresponding to the master microcontroller 12 and a column corresponding to the slave microcontroller 14. The timing diagram 50 begins at a time $T_0$ that corresponds to a start 102 for the master microcontroller 12 and a start 104 for the slave microcontroller 14. Beginning at the time $T_0$, the master microcontroller 12 generates the clock signal, as demonstrated at 106 in the example of FIG. 3, at a selected frequency intended for further communication. As an example, the master and slave microcontroller 12 and 14 can be configured to start at 102 and 104, respectively, during initialization of the communication interface system 10, or as an example, in response to an initialization command to transmit data at a different selected frequency. In the example of FIG. 2, the clock signal is demonstrated as a square-wave propagating as the signal $COM_{MS}$, and thus the signal COM that is provided from the master microcontroller 12 to the slave microcontroller 14. Also at the time $T_0$, as the slave microcontroller 14 receives the clock signal, the slave microcontroller 14 learns the selected frequency of the clock signal, demonstrated at 108 in the example of FIG. 3. Subsequent to the time $T_0$, the signal $COM_{SM}$ is demonstrated as "zero" to indicate that the signal $COM_{MS}$ is present on the two-wire communication cable 16, and that the master microcontroller 12 has control of the two-wire communication cable 16.

After a predetermined duration of time, beginning at a time $T_1$, the transmitter 18 of the master microcontroller 12 transmits a predetermined test pattern to the slave microcontroller 14 at the selected frequency previously transmitted in $T_0$. The transmission of the predetermined test pattern is demonstrated as a block "TEST" in the example of FIG. 2, and at 110 in the example of FIG. 3. The slave microcontroller 14 receives the predetermined test pattern at the receiver 24 and is configured to decode the predetermined test pattern based on the learned selected frequency. The slave microcontroller 14 can then determine if the information that was sent by the master microcontroller 12 corresponds to the predetermined test pattern, as demonstrated at the decision block 112 in the example of FIG. 3. In response to transmitting the predetermined test pattern, the master microcontroller 12 can cease transmission of the signals $COM_{MS}$ on the two-wire communication cable 16, and can thus give control of the two-wire communication cable 16 to the slave microcontroller 14, as demonstrated beginning at a time $T_2$ in the example of FIG. 2.

If the slave microcontroller 14 does not receive the predetermined test pattern (e.g., "NO" result), then the slave microcontroller 14 returns to the learn clock block 108. As an example, the slave microcontroller 14 can continuously learn the clock until the slave microcontroller 14 identifies the predetermined test pattern. If the slave microcontroller 14 does receive the predetermined test pattern (e.g., "YES" result), then the slave microcontroller 14 is configured to transmit a predetermined response pattern via the transmitter 22 to the master microcontroller 12 over the two-wire communication cable 16. The transmission of the predetermined response pattern is demonstrated as the signal $COM_{SM}$ transmitted as a block "RESPONSE" in the example of FIG. 2 at the time $T_2$, and at 114 in the example of FIG. 3. The master microcontroller 12 receives the predetermined response pattern at the receiver 20 and is configured to decode the predetermined response pattern based on the selected frequency learned previously in $T_0$. The master microcontroller 12 can then determine if the information that was sent by the slave microcontroller 14 corresponds to the predetermined test pattern, as demonstrated at the decision block 116 in the example of FIG. 3.

If the master microcontroller 12 does not receive the predetermined response pattern (e.g., "NO" result), then the master microcontroller 12 returns to the generate clock block 106. As an example, the master microcontroller 12 can wait for a predetermined duration of time before determining that the slave microcontroller 14 has not transmitted the predetermined response pattern. If the master microcontroller 12 does receive the predetermined test pattern (e.g., "YES" result), then the master microcontroller 12 is configured to switch to a free clocking mode, indicated at 118 in the example of FIG. 3 and beginning at a time $T_3$ in the example of FIG. 2. Particularly, prior to the time $T_3$, the master microcontroller 12 can begin in a clock learning mode, indicated at 52 in the example of FIG. 2. However, in response to the master microcontroller 12 receiving the indication that the slave microcontroller 14 has learned the selected frequency of the clock signal in response to the predetermined response pattern, the master microcontroller 12 can switch to the free clocking mode, indicated at 54 in the example of FIG. 2 beginning at the time $T_3$.

In the free clocking mode, the transmitter 18 of the master microcontroller 12 is configured to continuously transmit the signal $COM_{MS}$ as the clock signal at the selected frequency learned previously in $T_0$ over the two-wire communication cable 16 to the receiver 24 of the slave microcontroller 14. The slave microcontroller 14 is thus in a clock check mode, indicated at 120 in the example of FIG. 3, and is thus awaiting signal requests from the master microcontroller 12. As described previously, the clock signal can be configured to provide power from the master microcontroller 12 to the slave microcontroller 14. Thus, during the clock check mode, the master microcontroller 12 can continuously provide power to the slave microcontroller 14 via the clock signal.

At a time $T_4$, the transmitter 18 of the master microcontroller 12 transmits a master data signal request to the slave microcontroller 14 at the selected frequency set in $T_0$. The transmission of the master data signal request is demonstrated as a block "RQST" in the example of FIG. 2, and at 122 in the example of FIG. 3. The slave microcontroller 14 receives the master data signal request at the receiver 24 and is configured to decode the master data signal request based on the learned selected frequency. The slave microcontroller 14 can thus receive the master data signal request at 124 in the example of FIG. 3. In response to transmitting the master data signal request, the master microcontroller 12 can cease transmission of the signals $COM_{MS}$ on the two-wire communication cable 16, and can thus give control of the two-wire communication cable 16 to the slave microcontroller 14, as demonstrated beginning at a time $T_5$ in the example of FIG. 2.

In the example of FIG. 2, the master data signal request is demonstrated as including a predetermined header pattern 56, a data portion 58, and a predetermined tail pattern 60. The predetermined header pattern 56 is configured to indicate an imminent master data signal request to the slave microcontroller 14. Therefore, the slave microcontroller 14 can be configured to determine a distinction between the master data signal request and the clock signal in the signal $COM_{MS}$. The data portion includes the data associated with the master data signal request, and thus includes instructions to be executed by the slave microcontroller 14. Therefore, in response to the slave microcontroller 14 determining that the master data signal request is imminent via the predetermined header pattern 56, the slave microcontroller 14 can interpret the data in the data portion 58 for purposes of obtaining the actual data instructions therein. The predetermined tail pattern 60 is thus configured to indicate an end of the master data signal request, such that the slave microcontroller 14 can determine that the data instructions have concluded.

At the time $T_5$, the transmitter 22 of the slave microcontroller 14 can transmit the signal $COM_{SM}$ as a slave data signal to the receiver 20 of the master microcontroller 12. The transmission of the slave data signal is demonstrated as the signal $COM_{SM}$ transmitted as a block "DATA" in the example of FIG. 2 at the time $T_5$, and at 126 in the example of FIG. 3. The master microcontroller 12 receives the slave data signal at the receiver 20 and is configured to decode the slave data signal based on the selected frequency set previously. The master microcontroller 12 can then receive the data provided in the slave data signal that was provided in response to the master data signal request, as indicated at 128 in the example of FIG. 3. After the master microcontroller 14 receives the slave data signal, the master microcontroller 12 is configured to switch back to the free clocking mode 118, beginning at a time $T_6$ in the example of FIG. 2. Particularly, between the times $T_4$ and $T_6$, when the master microcontroller 12 transmits the master data signal request and the slave microcontroller 14 responds with the slave data signal, the master microcontroller 14 can be operating in the data transfer mode, indicated at 62 in the example of FIG. 2. However, in response to the master microcontroller 12 receiving the slave data signal from the slave microcontroller 14, the master microcontroller 12 can switch back to the free clocking mode, indicated at 64 in the example of FIG. 2 beginning at the time $T_6$.

Figure 4:
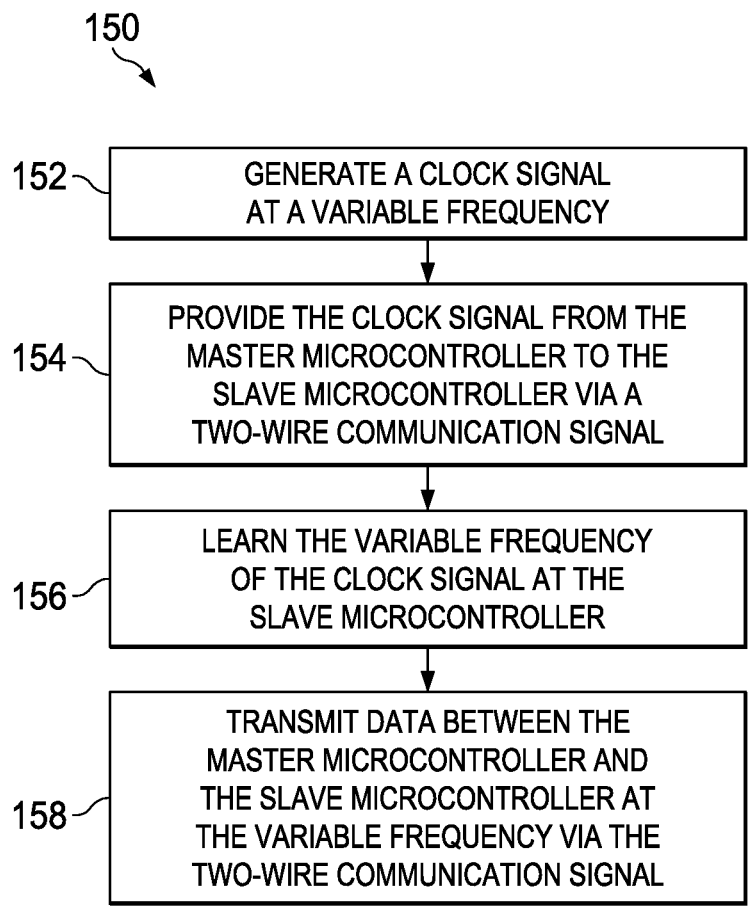
FIG. 4 illustrates an example of a method for providing two-wire communication between a master microcontroller and a slave microcontroller.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 150 for providing two-wire communication in a communication interface system (e.g., the communication interface system 10) between a master microcontroller (e.g., master microcontroller 12) and a slave microcontroller (e.g., slave microcontroller 14). At 152, a clock signal is generated at a selected frequency. At 154, the clock signal is provided from the master microcontroller to the slave microcontroller via a two-wire communication signal (e.g., the two-wire communication cable 16). At 156, the selected frequency of the clock signal is learned at the slave microcontroller. At 158, data (e.g., the master data signal request and the slave data signal) is transmitted between the master microcontroller and the slave microcontroller at the selected frequency via the two-wire communication signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A master microcontroller in a communication interface system, the master microcontroller comprising:
 a transmitter adapted to be coupled to a two-wire communication cable and configured to:
  generate a clock signal at a selected frequency of a variable range of frequencies;
  provide the clock signal for a predetermined duration of time during a clock learning mode;
  transmit a predetermined test pattern after the predetermined duration of time; and
  provide master data signal requests at the selected frequency during a data transfer mode; and
 a receiver adapted to be coupled to the two-wire communication cable and configured to
  receive a predetermined response pattern in response to the transmission of the predetermined test pattern; and
  receive slave data signals at the selected frequency in response to the master data signal requests during the data transfer mode.

2. The microcontroller of claim 1, wherein the clock signal is further configured to provide power.

3. The microcontroller of claim 1, wherein, in response to the receiver receiving the predetermined response pattern, the transmitter is configured to switch from the clock learning mode to a free clocking mode in which the transmitter provides the clock signal at the selected frequency until the master microcontroller is commanded to transmit the master data signal requests during the data transfer mode.

4. The microcontroller of claim 1, wherein, in response to the receiver not receiving the predetermined response pattern, the transmitter is configured to return to the clock learning mode.

5. The microcontroller of claim 1, wherein each of the master data signal requests comprises a predetermined header pattern configured to indicate an imminent master data signal request, a data portion comprising the master data signal request, and a predetermined tail pattern configured to indicate an end of the master data signal request.

6. The microcontroller of claim 1, wherein the master microcontroller is configured as RS-485 master microcontroller.

7. A slave microcontroller in a communication interface system, the slave microcontroller comprising:
 a receiver adapted to be coupled to a two-wired communication cable and configured to:
  receive a clock signal at a frequency for a predetermined duration of time during a clock learning mode;
  receive a predetermined test pattern; and
  receive master data signal requests at the frequency during a data transfer mode; and
 a transmitter adapted to be coupled to the two-wire communication cable and configured to
  transmit a predetermined response pattern in response to receiving the predetermined test pattern; and
  transmit slave data signals at the frequency in response to receiving the master data signal requests during the data transfer mode.

8. A method for providing two-wire communication in a communication interface system between a master microcontroller and a slave microcontroller, the method comprising:
 generating a clock signal at a selected frequency of a variable range of frequencies;
 providing the clock signal from the master microcontroller to the slave microcontroller via a two-wire communication signal;
 learning the selected frequency of the clock signal at the slave microcontroller;
 transmitting a predetermined test pattern from the master microcontroller to the slave microcontroller at the selected frequency via the two-wire communication cable in response to the slave microcontroller learning the selected frequency; and
 transmitting a predetermined response pattern from the slave microcontroller to the master microcontroller at the selected frequency via the two-wire communication cable in response to the transmission of the predetermined test pattern; and transmitting data between the master microcontroller and the slave microcontroller at the selected frequency via the two-wire communication cable.

9. The method of claim 8, wherein transmitting the data comprises:

transmitting master data signal requests from the master microcontroller to the slave microcontroller at the selected frequency via the two-wire communication cable during a data transfer mode; and transmitting slave data signals from the slave microcontroller to the master microcontroller at the selected frequency via the two-wire communication cable during a data transfer mode.

10. The method of claim 9, wherein transmitting the master data signal requests comprises transmitting the master data signal requests comprising a predetermined header pattern configured to indicate an imminent master data signal request to the slave microcontroller, a data portion comprising the master data signal request, and a predetermined tail pattern configured to indicate an end of the master data signal request.

11. The method of claim 8, wherein providing the clock signal comprises providing power from the master microcontroller to the slave microcontroller via the clock signal over the two-wire communication cable.

12. A communication interface system comprising:

a master microcontroller configured to:
  generate a clock signal at a variable frequency;
  provide the clock signal for a predetermined duration to a slave microcontroller of time on a two-wire communication cable during a clock learning mode;
  transmit a predetermined test pattern to the slave microcontroller after the predetermined duration of time; and
  generate master data signal requests at a selected frequency;

the slave microcontroller configured to:
  receive the clock signal;
  learn the selected frequency during the clock learning mode;
  receive the predetermined test pattern;
  transmit a predetermined response pattern to the master microcontroller in response to receiving the predetermined test pattern;
  receive the master data signal requests; and
  generate slave data signals at the selected frequency in response to the master data signal requests; and the two-wire communication cable interconnecting the master and slave microcontrollers and being configured to propagate the master data signal requests and the slave data signals.

13. The system of claim 12, wherein the clock signal is further configured to provide power to the slave microcontroller over the two-wire communication cable.

14. The system of claim 12, wherein, in response to the master microcontroller receiving the predetermined response pattern, the master microcontroller is configured to switch from the clock learning mode to a free clocking mode in which the master microcontroller provides the clock signal at the selected frequency to the slave microcontroller until the master microcontroller is commanded to transmit the master data signal requests to the slave microcontroller during the data transfer mode.

15. The system of claim 12, wherein, in response to the master microcontroller not receiving the predetermined response pattern, the master microcontroller is configured to return to the clock learning mode.

16. The system of claim 12, wherein each of the master data signal requests comprises a predetermined header pattern configured to indicate an imminent master data signal request to the slave microcontroller, a data portion comprising the master data signal request, and a predetermined tail pattern configured to indicate an end of the master data signal request.

* * * * *